United States Patent
Hasegawa (10) Patent No.: US 10,564,355 B2
(45) Date of Patent: Feb. 18, 2020

(54) OPTICAL WAVEGUIDE ELEMENT

(71) Applicant: FURUKAWA ELECTRIC CO., LTD., Tokyo (JP)

(72) Inventor: Junichi Hasegawa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/184,333

(22) Filed: Nov. 8, 2018

(65) Prior Publication Data

US 2019/0094463 A1 Mar. 28, 2019

Related U.S. Application Data

(63) Continuation of application No. PCT/JP2017/017655, filed on May 10, 2017.

(30) Foreign Application Priority Data

May 11, 2016 (JP) ................. 2016-095481

(51) Int. Cl.
*G02B 6/126* (2006.01)
*G02B 6/122* (2006.01)
(Continued)

(52) U.S. Cl.
CPC ......... *G02B 6/126* (2013.01); *G02B 6/02052* (2013.01); *G02B 6/122* (2013.01);
(Continued)

(58) Field of Classification Search
CPC ............................ G02B 6/126; G02B 6/02052
See application file for complete search history.

(56) References Cited

U.S. PATENT DOCUMENTS

| 6,606,442 B2 * | 8/2003 | Korenaga | ................ G01K 5/62 |
| | | | 374/E11.015 |
| 9,354,395 B2 | 5/2016 | Uchida et al. | |

(Continued)

FOREIGN PATENT DOCUMENTS

| JP | 2-110406 | 4/1990 |
| JP | 2003-315552 | 11/2003 |

(Continued)

OTHER PUBLICATIONS

International Search Report dated Aug. 1, 2017 in PCT/JP2017/017655, filed on May 10, 2017 (with English Translation).

(Continued)

*Primary Examiner* — Sung H Pak (74) *Attorney, Agent, or Firm* — Oblon, McClelland, Maier & Neustadt, L.L.P.

(57) ABSTRACT

A disclosed optical waveguide element includes a cladding portion formed on a substrate; an optical waveguide which is formed inside the cladding portion and has a refractive index higher than that of the cladding portion; an optical filter which is inserted into a slit formed in the cladding portion to divide the optical waveguide into a first optical waveguide and a second optical waveguide; and a first thin film element which is inserted into the slit along with the optical filter and is provided with a first thin film lens, wherein the first thin film lens provided in the first thin film element converges light that has propagated through the first optical waveguide and outputs into the slit into the second optical waveguide.

8 Claims, 9 Drawing Sheets

(51) Int. Cl.
  *G02B 6/02* (2006.01)
  *G02B 27/10* (2006.01)
  *G02B 6/12* (2006.01)
(52) U.S. Cl.
  CPC ............... *G02B 27/1006* (2013.01); *G02B 2006/12102* (2013.01); *G02B 2006/12109* (2013.01)

(56) References Cited

U.S. PATENT DOCUMENTS

| | | | |
|---|---|---|---|
| 2004/0080808 A1 | 4/2004 | Kawakami et al. | |
| 2004/0141677 A1* | 7/2004 | Hanashima | G02B 6/12 385/14 |
| 2004/0184702 A1* | 9/2004 | Hayamizu | G02B 6/12 385/14 |
| 2004/0228573 A1* | 11/2004 | Terakawa | G02B 6/12 385/24 |
| 2005/0145964 A1 | 7/2005 | Suzuki et al. | |
| 2005/0238279 A1* | 10/2005 | Fukuyama | G02B 6/262 385/14 |
| 2005/0281524 A1 | 12/2005 | Mouli | |
| 2006/0097334 A1 | 5/2006 | Suzuki et al. | |
| 2007/0092193 A1* | 4/2007 | Yokino | G02B 6/12 385/129 |
| 2008/0253411 A1 | 10/2008 | McPhail et al. | |
| 2013/0236136 A1 | 9/2013 | Nara et al. | |
| 2014/0241683 A1 | 8/2014 | Uchida et al. | |
| 2016/0246001 A1 | 8/2016 | Uchida et al. | |
| 2017/0153529 A1 | 6/2017 | McPhail et al. | |

FOREIGN PATENT DOCUMENTS

| | | |
|---|---|---|
| JP | 2004-61905 | 2/2004 |
| JP | 2004-347759 | 12/2004 |
| JP | 2005-116671 | 4/2005 |
| JP | 2007-187835 | 7/2007 |
| JP | 2007-532958 | 11/2007 |
| JP | 2013-210623 | 10/2013 |
| JP | 2015-219317 | 12/2015 |
| WO | WO 2012/132907 A1 | 10/2012 |

OTHER PUBLICATIONS

Written Opinion dated Aug. 1, 2017 in PCT/JP2017/017655, filed on May 10, 2017.
Japanese Office Action for Japanese Patent Application No. 2016-095481 dated Nov. 5, 2019 and English translation thereof.

* cited by examiner

OPTICAL WAVEGUIDE ELEMENT

CROSS-REFERENCE TO RELATED APPLICATION(S)

This application is a continuation of International Application No. PCT/JP2017/017655, filed on May 10, 2017 which claims the benefit of priority of the prior Japanese Patent Application No. 2016-095481, filed on May 11, 2016, the entire contents of which are incorporated herein by reference.

BACKGROUND

The present disclosure relates to an optical waveguide element.

An optical waveguide element using a planar light wave circuit (PLC) formed of quartz-based glass is used in an optical device using an optical communication or the like. In the optical waveguide constituting the PLC, a technique of using zirconia ($ZrO_2$) as a dopant for increasing a refractive index is disclosed (see JP 2013-210623 A). $ZrO_2$ is a material having a higher refractive index and a smaller thermal expansion coefficient than germania ($GeO_2$). When $ZrO_2$ is used as a dopant, a relative refractive index difference $\Delta$ of a core (an optical waveguide) to a cladding portion (hereinafter, simply referred to as a relative refractive index difference $\Delta$) can be largely increased as compared with the PLC using $GeO_2$ as a dopant. Accordingly, since a minimum bending radius allowed for the optical waveguide decreases, a decrease in size, a decrease in cost, and a high density integration of the PLC can be expected. For that reason, $ZrO_2$ is expected as a material capable of reducing a stress remaining in the optical waveguide while realizing a decrease in size of the PLC, the optical waveguide element using the same, and the optical device.

Further, as the optical waveguide element of which the relative refractive index difference $\Delta$ is high, there is known an optical waveguide element including a silicon thin wire optical waveguide or an optical waveguide formed of an InP-based semiconductor material (for example, GaInAsP) other than PLC.

Incidentally, in the optical waveguide element, there is a case in which a slit is formed in the cladding portion so as to divide a certain optical waveguide into two parts and an optical filter is inserted into the slit. For example, when TE polarized light propagates through the optical waveguide (light of a linear polarized wave having a polarization direction parallel to a principal surface of a substrate provided with the cladding portion) is converted into TM polarized light (light of a linear polarized wave having a polarization direction orthogonal to the TE polarized light), a configuration of inserting a half wavelength plate into the slit is adopted in some cases. At this time, the half wavelength plate is installed inside the slit so that an optical axis (a high-speed axis or a low-speed axis) forms an angle of 45° with respect to a principal surface of the substrate. In the optical waveguide element with such a configuration, when the TE polarized light propagates through one optical waveguide of the divided optical waveguides into the half wavelength plate, the polarization direction rotates by 90° so that the light becomes the TM polarized light by the half wavelength plate and is input into the other optical waveguide of the divided optical waveguides. Similarly, when the TM polarized light propagates through the one optical waveguide into the half wavelength plate, the light becomes the TE polarized light by the half wavelength plate and is output to the other optical waveguide. Further, when the TM polarized light propagates through the other optical waveguide into the half wavelength plate, the light becomes the TE polarized light by the half wavelength plate and is input to the one optical waveguide.

SUMMARY

However, such an optical waveguide element is somewhat disadvantageous in that loss (hereinafter, referred to as slit loss) of light occurs in the slit. The slit loss increases as the relative refractive index difference $\Delta$ of the optical waveguide to the cladding increases. Further, the slit loss increases as the width of the slit (the width in the light propagation direction) becomes wider.

In order to suppress the slit loss, there is known a method of providing a taper portion at the front and rear sides of the slit so that a width of the optical waveguide (a width in a direction parallel to the principal surface of the substrate or a width in a direction perpendicular to the extension direction of the optical waveguide) changes in the extension direction. With such a taper portion, when the light propagates in the taper portion of one optical waveguide, the mode field is enlarged in the width direction, and then the light is input to the taper portion of the other optical waveguide, the loss is suppressed to a certain degree. However, since it is difficult to provide such a taper portion in the height direction of the optical waveguide (a direction perpendicular to the principal surface of the substrate), it is difficult to reduce the loss of the light caused by the slit. For example, the inventors have carefully examined a relationship between the slit loss and the relative refractive index difference $\Delta$ at the wavelength of 1.55 µm. Here, in the optical waveguide element provided with the same waveguide structure, the same slit width (20 µm), and the same taper portion, the slit loss was about 0.5 dB when the relative refractive index difference $\Delta$ was 1.5%, the slit loss was about 1 dB when the relative refractive index difference $\Delta$ was 2.5%, and the slit loss was about 3 dB when the relative refractive index difference $\Delta$ was 5.5%. Namely, it was proved that the slit loss abruptly increased as the relative refractive index difference $\Delta$ increase The present disclosure has been made in view of the above, and is directed to an optical waveguide element.

According to a first aspect of the present disclosure, an optical waveguide element is provided which includes a cladding portion formed on a substrate; an optical waveguide which is formed inside the cladding portion and has a refractive index higher than that of the cladding portion; an optical filter which is inserted into a slit formed in the cladding portion to divide the optical waveguide into a first optical waveguide and a second optical waveguide; and a first thin film element which is inserted into the slit along with the optical filter and is provided with a first thin film lens, wherein the first thin film lens provided in the first thin film element converges light that has propagated through the first optical waveguide and outputs into the slit into the second optical waveguide. The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

Hereinafter, embodiments of an optical waveguide element according to the disclosure will be described in detail with reference to the drawings. Additionally, the disclosure is not limited to the embodiments. Further, the same reference numerals are given to the same or corresponding components in the drawings. Furthermore, it should be noted that the drawings are schematic and the relationship between the dimensions of the components and the like are different from actual ones. Also in the drawings, there may be cases in which the relationships and the ratios of the dimensions are different from each other. Further, the terms not specifically defined in the specification are appropriately set based on the definition and the measurement method of ITU-T G.650.1. In the drawings, the directions will be described by appropriately using the XYZ coordinate system which is an orthogonal coordinate system of three axes (X axis, Y axis, Z axis).

First Embodiment

Figure 1A:
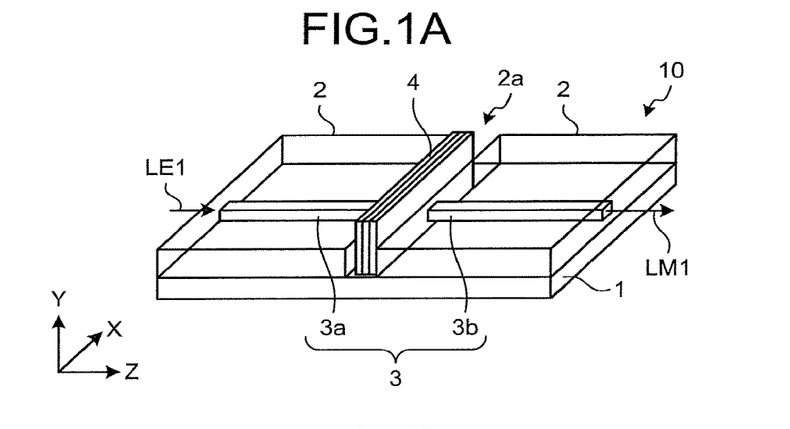
FIG. 1A is a schematic diagram illustrating an optical waveguide element according to a first embodiment.
Figure 1B:
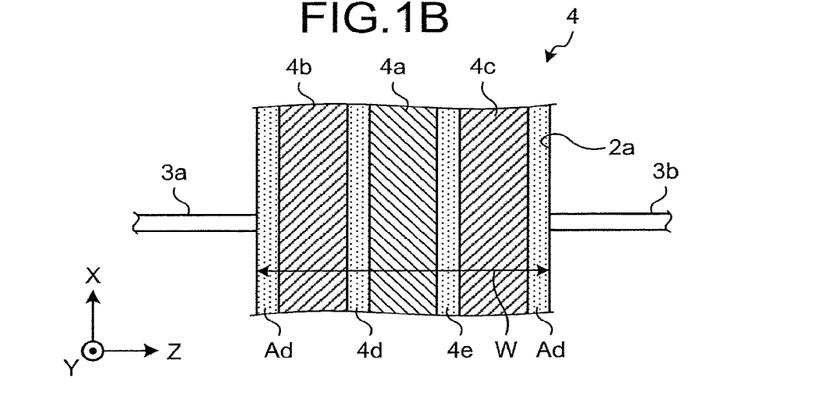
FIG. 1B is a schematic diagram illustrating the optical waveguide element according to the first embodiment.
Figure 1C:
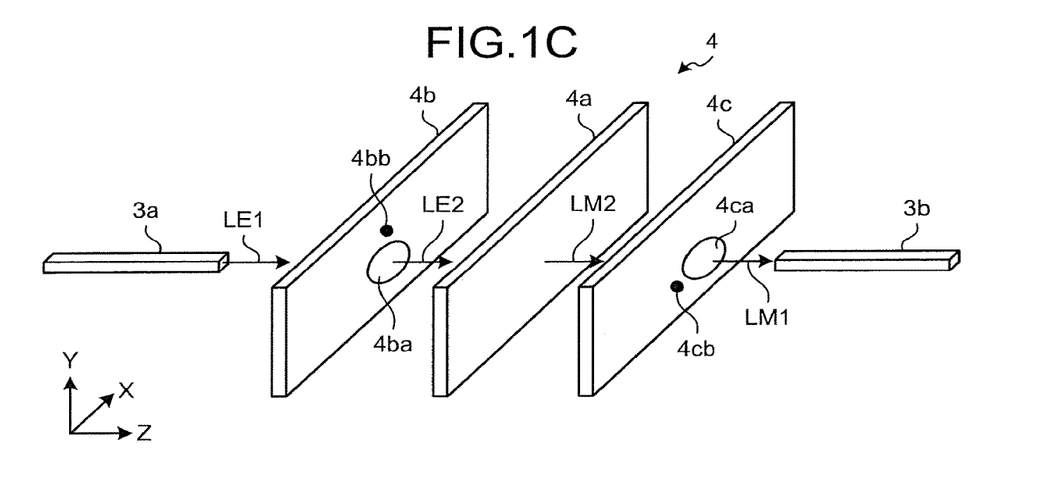
FIG. 1C is a schematic diagram illustrating the optical waveguide element according to the first embodiment.

FIGS. 1A to 1C are schematic diagrams illustrating an optical waveguide element according to a first embodiment. As illustrated in FIG. 1A, an optical waveguide element 10 includes a cladding portion 2 which is formed of quartz-based glass and is formed on a principal surface of a substrate 1 formed of silicon or quartz glass and an optical waveguide 3 which is formed inside the cladding portion 2 and has a refractive index higher than that of the cladding portion 2. The cladding portion 2 is provided with a slit 2a which divides the optical waveguide 3 into a first optical waveguide 3a and a second optical waveguide 3b. The optical waveguide element 10 further includes an optical filter unit 4 which is inserted into the slit 2a.

The slit 2a extends in the X direction and the optical waveguide 3 extends in the Z direction. Incidentally, FIG. 1A illustrates only a part of the optical waveguide element 10. The optical waveguide element 10 actually has a shape which is further widened within the XZ plane. A length of the substrate 1 and the cladding portion 2 in the X direction is longer than the length of the slit 2a in the X direction. Thus, in the first embodiment, the cladding portion 2 is not divided into two parts by the slit 2a.

The optical waveguide 3 is formed of quartz-based glass containing fine particles of $ZrO_2$ which is a dopant for increasing a refractive index. Accordingly, since the optical waveguide 3 has a refractive index higher than that of the cladding portion 2, the optical waveguide 3 serves as the optical waveguide that confines and guides light. The optical waveguide 3 has a relative refractive index difference Δ of 5% to 10% with respect to the cladding portion 2 at the wavelength of 1.55 μm and a cross-sectional size of 1.5 μm to 3.5 μm along one side. The cross-section of the optical waveguide 3 is basically square, but may be rectangular or trapezoidal.

Since the optical waveguide 3 contains fine particles of $ZrO_2$, the relative refractive index difference Δ at the wavelength of 1.55 μm can be set to, for example, 1.5% to 30% by the adjustment of the content.

The optical filter unit 4 includes, as illustrated in FIG. 1B, an optical filter 4a which is a half wavelength plate and two thin film elements 4b and 4c. The optical filter 4a is disposed between the thin film elements 4b and 4c and is formed of, for example, polyimide. The optical filter 4a has a thickness that depends on the wavelength of the input light, for example, a thickness of about 15 μm. The optical filter 4a and two thin film elements 4b and 4c adhere to each other by translucent adhesives 4d and 4e. In this way, the thin film elements 4b and 4c constitute the optical filter unit 4 along with the optical filter 4a, and are inserted into the slit 2a. The optical filter unit 4 is fixed into the slit 2a by adhering using adhesives Ad.

The thin film elements 4b and 4c are formed of photonic crystal and are provided with thin film lenses 4ba and 4ca respectively formed of photonic crystal as illustrated in FIG. 1C.

The photonic crystal is a material formed by periodically arranging mediums having different refractive indexes in a predetermined pattern and the thin film lenses 4ba and 4ca are portions having lens functions by the adjustment of the pattern or period of the photonic crystal for the thin film elements 4b and 4c (see JP 2005-116671 A, JP 2004-347759 A, and JP 2007-532958 A).

In the first embodiment, the thin film lenses 4ba and 4ca respectively have polarization characteristics that mainly transmit only linearly polarized waves. For that reason, the thin film elements 4b and 4c are respectively provided with markers 4bb and 4cb in order to specify the transmission polarization direction. Each of the markers 4bb and 4cb has a refractive index different from that of its peripheral portion, and thus can be visually checked.

Then, in the optical filter unit 4, the thin film elements 4b and 4c are respectively disposed so that the transmission polarization directions of the thin film lenses 4*ba* and 4*ca* are orthogonal to each other and are fixed to each other by adhering so that the optical axis of the optical filter 4*a* serving as the half wavelength plate forms an angle of 45° with respect to the transmission polarization directions of the thin film lenses 4*ba* and 4*ca*. Further, the optical filter unit 4 is inserted into the slit 2*a* and adhered thereto in an arraignment where the thin film element 4*b* is located on the side of the first optical waveguide 3*a*, the thin film element 4*c* is located on the side of the second optical waveguide 3*b*, the thin film lens 4*ba* allows the transmission of the TE polarized light, the thin film lens 4*ca* allows the transmission of the TM polarized light, and the optical axis of the thin film lens 4*ba* is aligned to the optical axis of the thin film lens 4*ca*.

Such thin film elements 4*b* and 4*c* may have a thickness of, for example, about 15 μm. When the optical filter 4*a* and the thin film elements 4*b* and 4*c* are set to be 15 μm thick, the adhesives 4*d* and 4*e* are set to be 1.5 μm thick, and the adhesive Ad is set to be 1 μm thick, a width W of the slit 2*a* in the Z direction is preferably 50 μm.

Next, the function of the optical waveguide element 10 will be described. The optical waveguide element 10 has a function of converting TE polarized wave light LE1 input to the first optical waveguide 3*a* into TM polarized wave light LM1 and outputting the TM polarized wave light from the second optical waveguide 3*b*. Specifically, when the TE polarized wave light LE1 is input to the first optical waveguide 3*a* as illustrated in FIG. 1A, the TE polarized wave light LE1 propagates through the first optical waveguide 3*a* and exits therefrom toward the thin film lens 4*ba* and then into the slit 2*a* as illustrated in FIG. 1C. The thin film lens 4*ba* allows the input TE polarized wave light LE1 to transmit therethrough and spreads the TE polarized wave light toward the optical filter 4*a*. Namely, a beam diameter of the light LE1 is increased in the X direction and the Y direction of the XY plane direction and the light is output as light LE2 to the optical filter 4*a*. The optical filter 4*a* rotates the polarization direction of the light LE2 by 90° and outputs the light as TM polarized wave light LM2 to the thin film lens 4*ca*. The thin film lens 4*ca* condenses the input TM polarized wave light LM2 while allowing the transmission therethrough and outputs the light as the light LM1 to the second optical waveguide 3*b* while decreasing the beam diameter in the X direction and the Y direction of the XY plane direction. The light LM1 input to the second optical waveguide 3*b* propagates as the TM polarized wave and then outputs therefrom as illustrated in FIG. 1A.

In this way, in the optical waveguide element 10, the slit 2*a* is provided with the optical filter unit 4 having the thin film lens 4*ba* which spreads the light LE1 that has propagated through the first optical waveguide 3*a* and increases the beam diameter, and the thin film lens 4*ca* which decreases the beam diameter of the light LM2 having passed through the optical filter 4*a* and condenses the light to the second optical waveguide 3*b*. Accordingly, the light LE1 is output from the first optical waveguide 3*a* into the optical filter unit 4 in the slit 2*a* and then the light LM1 of which the polarization direction rotates by 90° can be coupled into the second optical waveguide 3*b*, with high coupling efficiency. As a result, it is possible to reduce the slit loss due to the slit 2*a*.

Next, an example of a method of manufacturing the optical waveguide element 10 will be described.

First, a lower cladding layer serving as a part of the cladding portion 2, provided on the side of the substrate 1, is formed on the substrate 1 by using, for example, a plasma CVD (Chemical Vapor Deposition) method. An optical waveguide forming layer for forming the optical waveguide 3 is formed on the lower cladding layer according to a sputtering method using a $SiO_2$ target and a $ZrO_2$ target which are one-element system targets.

Next, the lower cladding layer and the optical waveguide forming layer are heat-treated and annealed to form transparent glass.

Subsequently, the optical waveguide forming layer is patterned so as to have a pattern of the optical waveguide 3 by photolithography and etching, thereby to form the optical waveguide 3. Etching is performed by, for example, dry etching using a fluorine-based gas (for example, $CF_4$), which is used in a quartz-based glass processing.

Next, an over cladding portion is formed to cover the lower cladding layer and the optical waveguide 3 so as to form the cladding portion 2 including the lower cladding layer and the over cladding portion. The over cladding portion can be formed by depositing fine glass particles formed of quartz-based glass so as to cover the lower cladding layer and the optical waveguide 3 using, for example, a known flame hydrolysis deposition (FHD) method and heating and melting the fine glass particles so as to form transparent glass.

Then, the slit 2*a* is formed in the cladding portion 2 by photolithography and etching. The depth of the slit 2*a* is not particularly limited, but in the first embodiment, the etching is performed to the depth of the bottom surface (the boundary surface between the cladding portion 2 and the substrate 1) of the cladding portion 2.

Next, the optical filter unit 4 manufactured by adhering the optical filter 4*a* and the thin film elements 4*b* and 4*c* using the adhesives 4*d* and 4*e* is inserted into the slit 2*a*. The optical axes of the thin film lenses 4*ba* and 4*ca*, the first optical waveguide 3*a*, and the second optical waveguide 3*b* are adjusted to be aligned to one another. The optical axis is preferably adjusted by active alignment. Specifically, light is input to the first optical waveguide 3*a*, the position of the optical filter unit 4 is adjusted within the XY plane while measuring the power of the light passing through the optical filter unit 4 and output from the second optical waveguide 3*b*, and the optical filter unit 4 is fixed into the slit 2*a* by adhering using the adhesives Ad (FIG. 1B) when a largest power of the measured light is obtained. Accordingly, the optical waveguide element 10 is completed.

Here, as an example of the disclosure, characteristics of the optical waveguide element having a configuration of the first embodiment are calculated by simulation. Additionally, a relative refractive index difference Δ of the optical waveguide at a wavelength of 1.55 μm was set to 5.5% and a cross-section size of the optical waveguide was set to 3.0 μm×3.0 μm. At this time, a mode field diameter (MFD) of the light having a wavelength of 1.55 μm that propagates through the optical waveguide is about 3 μm. Here, the mode field diameter is set to a diameter of a point in which the intensity becomes 5% of the maximum intensity in the NFP (Near-Field Pattern) of the light that propagate through the core (the optical waveguide). Incidentally, the mode field diameter is defined as an average value of long and short diameters when the mode field is oval. Further, the width of the slit is set to 50 μm. Further, all of the optical filter corresponding to the half wavelength plate formed of polyimide and two thin film elements provided with the thin film lens are formed to have a thickness of 15 μm, the thickness of the adhesive used to adhere the half wavelength plate and the thin film elements is set to 1.5 μm, and the thickness of the adhesive adhering the optical filter unit into the slit is set to 1 µm. The thin film lens provided in the thin film element disposed on the side of the first optical waveguide was made to have a lens function of magnifying, at a wavelength of 1.55 µm, the light having a beam diameter of 3.5 µm to the light having a beam diameter of 10 µm. Further, the thin film lens provided in the thin film element disposed on the side of the second optical waveguide was made to have a lens function of demagnifying, at a wavelength of 1.55 µm, the light having a beam diameter of 10 µm to the light having a beam diameter of 3.5 µm. Here, the beam diameter of the light is a diameter of a point in which the intensity becomes $1/e^2$ of the maximum intensity when the beam profile is approximated by Gaussian.

The slit loss of the optical waveguide element having the above configuration was calculated as 0.5 dB by simulation. This value is a practically desirable value capable of largely reducing the slit loss (for example, 3 dB), compared to a case where the thin film element provided with the thin film lens is not used.

Second Embodiment

Figure 2:
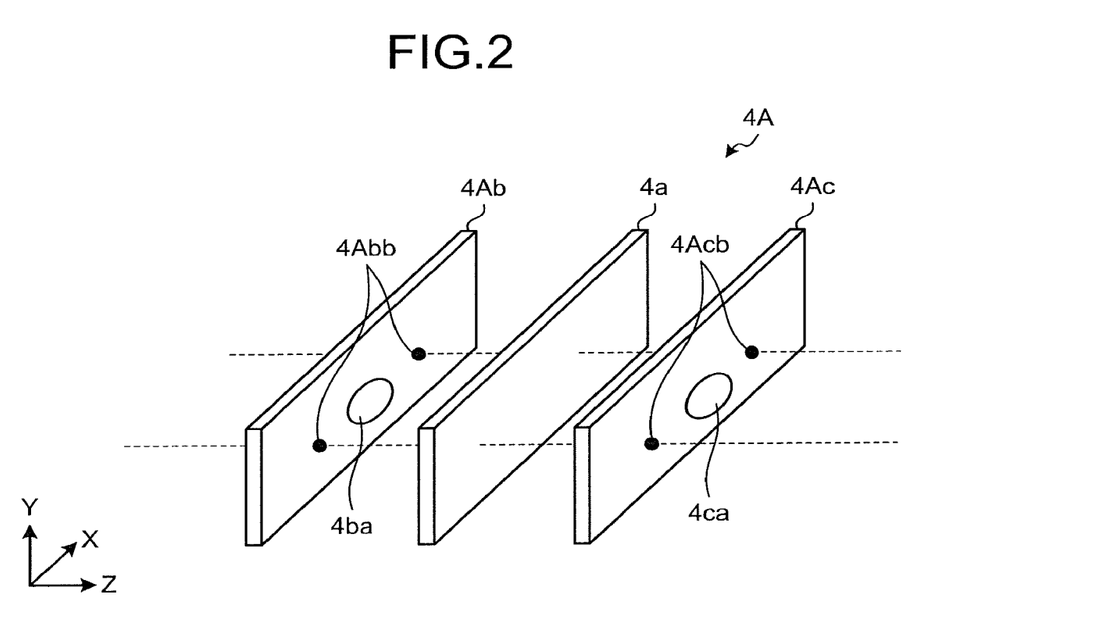
FIG. 2 is a schematic exploded perspective view of an optical filter unit of an optical waveguide element according to a second embodiment.

Next, an optical waveguide element according to a second embodiment will be described. The first embodiment and the second embodiment are different only in the optical filter unit. Further, the optical waveguide element according to the second embodiment has a function of converting the input TE polarized light into the TM polarized light and outputting the light, similarly to the optical waveguide element 10 according to the first embodiment. Hereinafter, the optical filter unit will be described in detail. FIG. 2 is a schematic exploded perspective view of an optical filter unit of the optical waveguide element according to the second embodiment.

As illustrated in FIG. 2, an optical filter unit 4A includes an optical filter 4a and thin film elements 4Ab and 4Ac. The optical filter 4a and two thin film elements 4Ab and 4Ac adhere to each other by the translucent adhesive to form the optical filter unit 4A.

Both the thin film elements 4Ab and 4Ac are formed of photonic crystal. The thin film elements are provided with the thin film lenses 4ba and 4ca formed of photonic crystal, respectively. Further, the thin film element 4Ab is provided with two markers 4Abb for aligning the optical axis. The two markers 4Abb are respectively located on both sides of the thin film lens 4ba in the X direction and have a predetermined positional relationship with respect to the optical axis of the thin film lens 4ba. The thin film element 4Ac is also provided with two markers 4Acb for aligning the optical axis. The two markers 4Acb are respectively located on both sides of the thin film lens 4ca in the X direction and have a predetermined positional relationship with respect to the optical axis of the thin film lens 4ca. The positional relationship between two markers 4Abb and the optical axis of the thin film lens 4ba is the same as the positional relationship between two markers 4Acb and the optical axis of the thin film lens 4ca. The markers 4Abb and 4Acb are portions, each of which has a refractive index different from that of its peripheral portion, and can be visually checked.

The optical axis of the thin film lens 4ba can be easily aligned to the optical axis of the thin film lens 4ca by aligning two markers 4Abb of the thin film element 4Ab and two markers 4Acb of the thin film element 4Ac within the XY plane as indicated by a dashed line in FIG. 2 at the time of assembling the optical filter unit 4A. Accordingly, it is possible to easily assemble the optical filter unit 4A of which excessive loss caused by the optical axis shift is reduced.

Third Embodiment

Next, an optical waveguide element according to a third embodiment will be described. FIGS. 3A to 3D are schematic diagrams illustrating the optical waveguide element and the optical filter unit according to the third embodiment and an optical axis adjustment method.

Figure 3A:
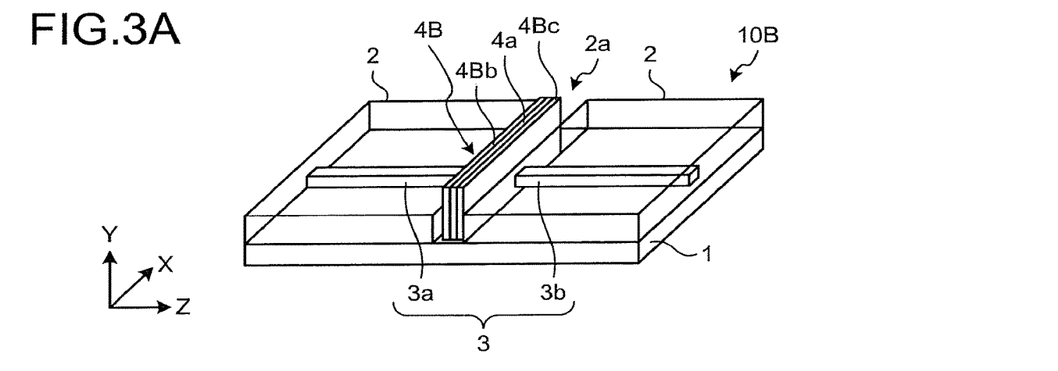
FIG. 3A is a schematic diagram illustrating an optical waveguide element and an optical filter unit according to a third embodiment and an optical axis adjustment method.

As illustrated in FIG. 3A, an optical waveguide element 10B has a configuration in which the optical filter unit 4 is replaced by an optical filter unit 4B as compared with the optical waveguide element 10 according to the first embodiment. Further, the optical waveguide element 10B has a function of converting the input TE polarized light into the TM polarized light and outputting the TM polarized light, similarly to the optical waveguide element 10. Hereinafter, the optical filter unit 4B will be described in detail.

The optical filter unit 4B includes the optical filter 4a and thin film elements 4Bb and 4Bc. The optical filter 4a and the two thin film elements 4Bb and 4Bc adhere to each other by the translucent adhesive to form the optical filter unit 4B.

Figure 3B:
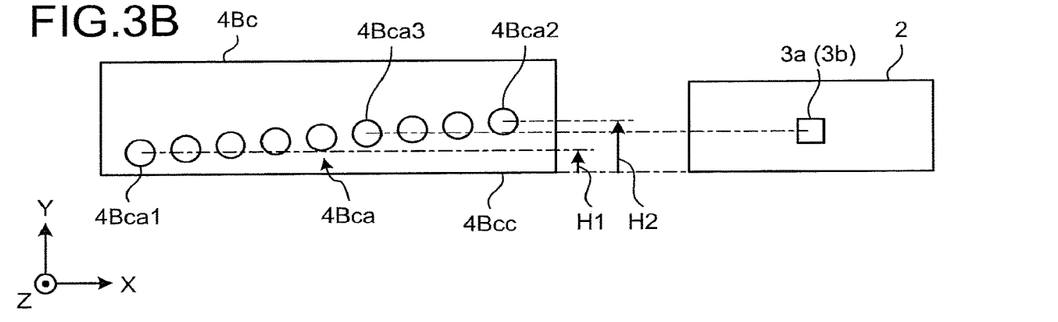
FIG. 3B is a schematic diagram illustrating the optical waveguide element and the optical filter unit according to the third embodiment and the optical axis adjustment method.

Both the thin film elements 4Bb and 4Bc are formed of photonic crystal. Further, the thin film elements 4Bb and 4Bc are provided with a plurality of thin film lenses which are formed of photonic crystal and are formed to have different heights from the bottom surfaces of the thin film elements 4Bb and 4Bc. Specifically, as illustrated in FIG. 3B, for example, the thin film element 4Bc is provided with nine thin film lenses 4Bca which are formed to have different heights from a bottom surface 4Bcc in the Y direction. The nine thin film lenses 4Bca are arranged in the X direction. A height H1 of a thin film lens 4Bca1 located at the farthermost position in the negative X direction is the lowest. And heights of the thin film lenses are increased toward the positive X direction. A height H2 of the thin film lens 4Bca2 located at the farthermost position in the positive X direction is the highest. Also in the thin film element 4Bb, nine thin film lenses are arranged so that the optical axes thereof are aligned to the optical axes of the corresponding nine thin film lenses 4Bca of the thin film element 4Bc. For the light input from the first optical waveguide 3a, the thin film lens provided in the thin film element 4Bb has a characteristic of allowing only the transmission of the TE polarized light and a beam enlargement function similarly to the thin film lens 4ba (FIG. 1C) and the thin film lens provided in the thin film element 4Bc has a characteristic of allowing only the transmission of the TM polarized light and a beam reduction function similarly to the thin film lens 4ca (FIG. 1C).

Figure 3C:
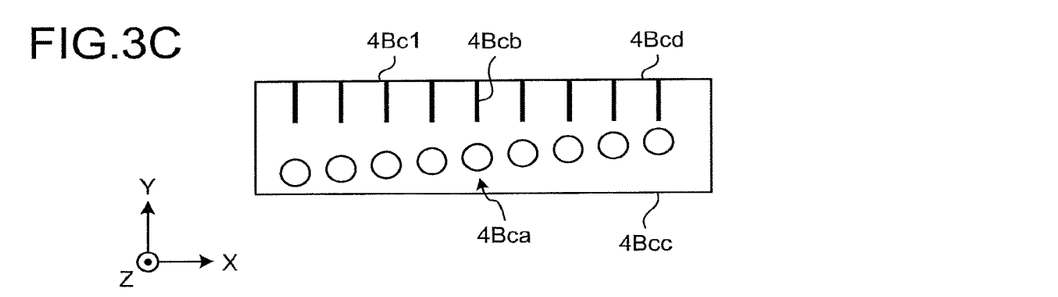
FIG. 3C is a schematic diagram illustrating the optical waveguide element and the optical filter unit according to the third embodiment and the optical axis adjustment method.

Incidentally, the thin film element 4Bc may be replaced by a thin film element 4Bc1 illustrated in FIG. 3C in the optical filter unit 4B. Similarly to the thin film element 4Bc, the thin film element 4Bc1 is provided with the nine thin film lenses 4Bca which are formed to have different heights from the bottom surface 4Bcc in the Y direction. Further, nine markers 4Bcb provided at the positions respectively corresponding to the positions of the nine thin film lenses 4Bca in the X direction are provided on the side of a top surface 4Bcd facing the bottom surface 4Bcc in the thin film element 4Bc1. These markers 4Bcb indicate the respective positions of the thin film lenses 4Bca in the X direction. Additionally, the thin film element 4Bb may be also replaced by the thin film element having the same marker as that of the thin film element 4Bc1.

Here, for example, in the optical waveguide element 10 according to the first embodiment, there is a need to adjust the position by moving the optical filter unit 4 within the XY plane at the time of aligning the optical axes of the thin film lenses 4ba and 4ca, the first optical waveguide 3a, and the second optical waveguide 3b. For that reason, it takes time for aligning the optical axis. Here, when the optical filter unit 4 is gripped by a jig or the like and the position of the optical filter unit 4 is adjusted, there is a possibility that the thin optical filter unit 4 may be damaged.

In contrast, the thin film elements 4Bb and 4Bc of the optical filter unit 4B are provided with the nine thin film lenses which are formed to have different heights from the bottom surfaces. Thus, the optical axis of any one of nine thin film lenses having different heights is aligned to the optical axes of the first optical waveguide 3a and the second optical waveguide 3b in such a manner that the optical filter unit 4B inserted into the slit 2a is brought into contact with the bottom surface of the slit 2a and is just slid in the X direction as indicated by the arrow Ar in FIG. 3D at the time of aligning the optical axes of the thin film lenses of the thin film elements 4Bb and 4Bc, the first optical waveguide 3a, and the second optical waveguide 3b. Also in this case, the optical filter unit 4B is fixed into the slit 2a by adhering using an adhesive when a largest power of the measured light is obtained after the active alignment. Additionally, FIG. 3B illustrates a case in which the optical axes are aligned when the positions of the thin film lens 4Bca3 located at the sixth position from the thin film lens 4Bca1, the first optical waveguide 3a, and the second optical waveguide 3b are the same in the Y direction as an example.

Figure 3D:
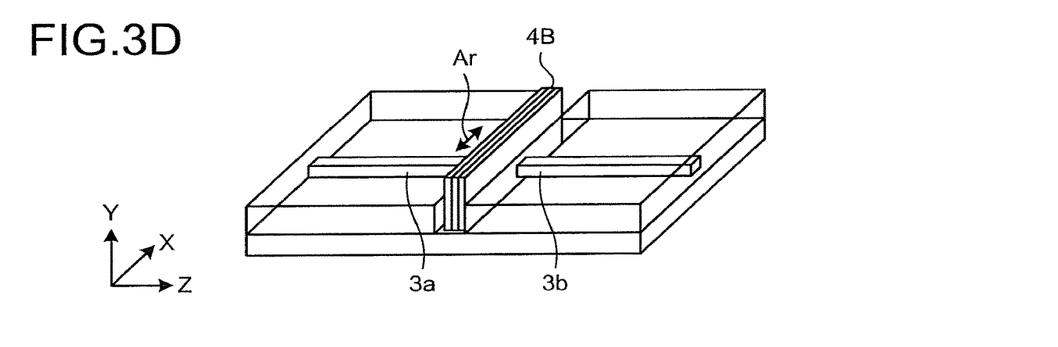
FIG. 3D is a schematic diagram illustrating the optical waveguide element and the optical filter unit according to the third embodiment and the optical axis adjustment method.

When the optical axis alignment is performed as described above by using the optical filter unit 4B, it is possible to promptly perform the optical axis alignment of the thin film lenses of the thin film elements 4Bb and 4Bc, the first optical waveguide 3a, and the second optical waveguide 3b in a short time even when the distance between the bottom surface of the slit 2a and each of the first optical waveguide 3a and the second optical waveguide 3b in the Y direction deviates from the designed value due to a manufacturing error or the like. Further, since it is possible to align the optical axis just by sliding the optical filter unit 4B while slightly pressing the top surface thereof without gripping the optical filter unit 4B, the possibility of the damage of the optical filter unit 4B is extremely low. Further, since the bottom surface of the optical filter unit 4B including the thin film elements 4Bb and 4Bc formed of photonic crystal contacts the bottom surface of the slit 2a, it is possible to perform a stable adhering and fixing operation and to ensure the reliability of the optical waveguide element 10B for a long period of time.

Further, it is possible to further promptly perform the optical axis alignment in a short time by using the thin film element provided with the marker similarly to the thin film element 4Bc1 illustrated in FIG. 3C.

Fourth and Fifth Embodiments

Figure 4A:
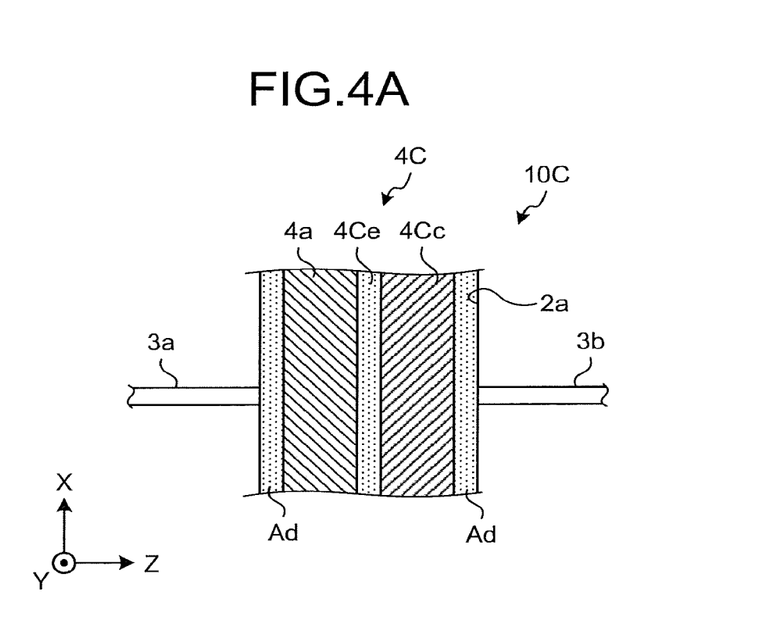
FIG. 4A is a schematic diagram illustrating an optical waveguide element according to a fourth embodiment.
Figure 4B:
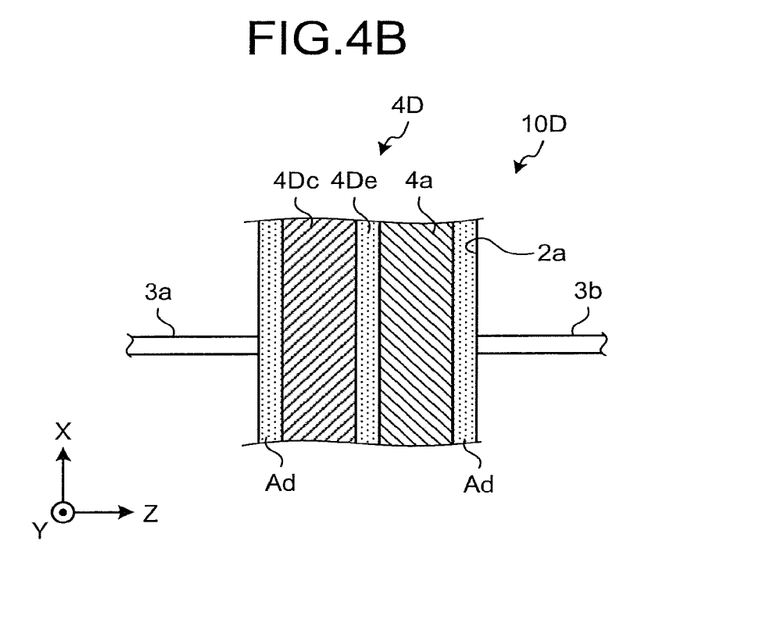
FIG. 4B is a schematic diagram illustrating an optical waveguide element according to a fifth embodiment.

Next, optical waveguide elements according to fourth and fifth embodiments will be described. FIGS. 4A and 4B are schematic diagrams illustrating the optical waveguide elements according to the fourth and fifth embodiments.

As illustrated in FIGS. 4A and 4B, an optical waveguide element 10C according to the fourth embodiment and an optical waveguide element 10D according to the fifth embodiment respectively have a configuration in which the optical filter unit 4 is replaced by optical filter units 4C and 4D as compared with the optical waveguide element 10 according to the first embodiment. Further, the optical waveguide elements 10C and 10D have a function of converting the input TE polarized light into the TM polarized light and outputting the TM polarized light, similarly to the optical waveguide element 10. Hereinafter, the optical filter units 4C and 4D will be described in detail.

The optical filter unit 4C includes the optical filter 4a and a thin film element 4Cc. The optical filter 4a and the thin film element 4Cc adhere to each other by a translucent adhesive 4Ce to form the optical filter unit 4C. The thin film element 4Cc is formed of photonic crystal. Further, the thin film element 4Cc is provided with a thin film lens formed of photonic crystal. The thin film lens has a characteristic of allowing only the transmission of the TM polarized light and a beam reduction function with respect to the light input from the first optical waveguide 3a. Further, the optical filter unit 4C is disposed so that the optical axes of the thin film lens, the first optical waveguide 3a, and the second optical waveguide 3b are aligned.

In the optical waveguide element 10C, when the TE polarized light is input to the first optical waveguide 3a, the TE polarized light propagates through the first optical waveguide 3a and outputs to the optical filter 4a inside the slit 2a. The output light is input to the optical filter 4a while the beam diameter is enlarged depending on an NA of the first optical waveguide 3a. The optical filter 4a rotates the polarization direction of the input light by 90° and outputs the light as the TM polarized light to the thin film lens of the thin film element 4Cc. The thin film lens transmits and condenses the input TM polarized light, reduces the beam diameter in the X direction and the Y direction of the XY plane direction, and outputs the light to the second optical waveguide 3b. The second optical waveguide 3b allows the input TM polarized wave to propagate therethrough and to output therefrom.

On the other hand, the optical filter unit 4D includes the optical filter 4a and a thin film element 4Dc. The optical filter 4a and the thin film element 4Dc adhere to each other by a translucent adhesive 4De to form the optical filter unit 4D. The thin film element 4Dc is formed of photonic crystal. Further, the thin film element 4Dc is provided with a thin film lens formed of photonic crystal. The thin film lens has a characteristic of allowing only the TE polarized light and a beam reduction function with respect to the light input from the first optical waveguide 3a. Further, the optical filter unit 4D is disposed so that the optical axes of the thin film lens, the first optical waveguide 3a, and the second optical waveguide 3b are aligned.

In the optical waveguide element 10D, when the TE polarized light is input to the first optical waveguide 3a, the TE polarized light propagates through the first optical waveguide 3a and outputs into the thin film lens of the thin film element 4Dc inside the slit 2a. The thin film lens transmits and condenses the input TE polarized light, reduces the beam diameter in the X direction and the Y direction of the XY plane direction, and outputs the light to the optical filter 4a. The optical filter 4a rotates the polarization direction of the input light by 90° and outputs the light as the TM polarized light. The output light is output to the second optical waveguide 3b. The second optical waveguide 3b allows the input TM polarized wave to propagate therethrough and to output therefrom.

The above-described optical waveguide elements 10C and 10D are provided with the optical filter units 4C and 4D, respectively, which are thinner by only one thin film element and one adhesive layer as compared with the optical filter unit 4 of the optical waveguide element. Therefore, the slit loss may be reduced by reducing the excessive loss caused by the optical axis shift at the time of adhering the thin film elements as compared with a case in which two thin film elements are provided. Further, a desired function can be realized by one thin film element, which leads to a cost reduction.

Sixth Embodiment

Figure 5:
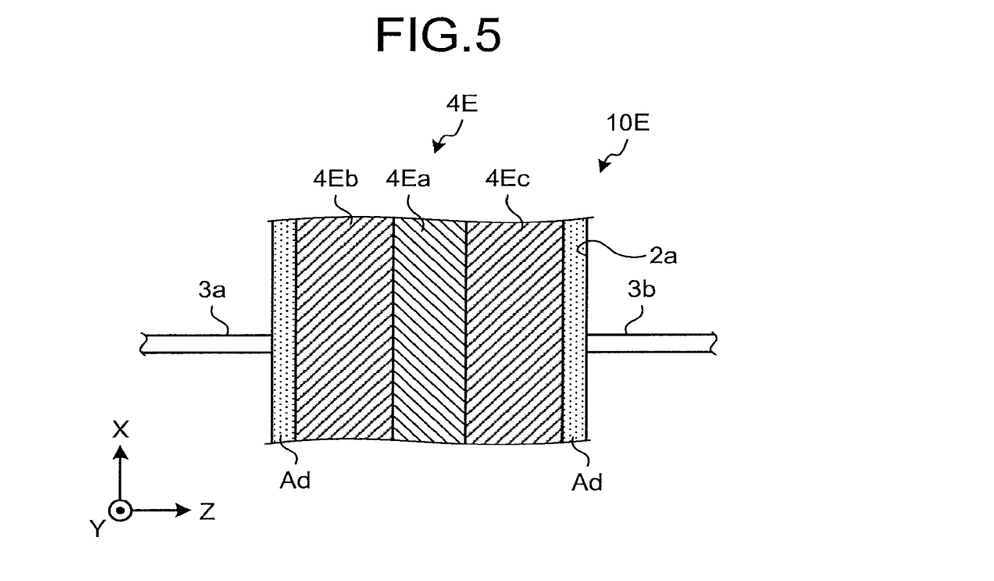
FIG. 5 is a schematic diagram illustrating an optical waveguide element according to a sixth embodiment.

Next, an optical waveguide element according to a sixth embodiment will be described. FIG. 5 is a schematic diagram illustrating the optical waveguide element according to the sixth embodiment.

As illustrated in FIG. 5, an optical waveguide element 10E according to the sixth embodiment has a configuration in which the optical filter unit 4 is replaced by an optical filter unit 4E as compared with the optical waveguide element 10 according to the first embodiment. Further, the optical waveguide element 10E has a function of converting the input TE polarized light into the TM polarized light and outputting the TM polarized light, similarly to the optical waveguide element 10. Hereinafter, the optical filter unit 4E will be described in detail.

In the optical filter unit 4E, an optical filter 4Ea which is a half wavelength plate and thin film elements 4Eb and 4Ec provided with the thin film lenses are integrally formed of photonic crystal. It is known that the photonic crystal also serves as the half wavelength plate (see JP 2003-315552 A). For the light input from the first optical waveguide 3a, the thin film lens provided in the thin film element 4Eb has a characteristic of allowing only the transmission of the TE polarized light and a beam enlargement function, similarly to the thin film lens 4ba. Additionally, the thin film lens provided in the thin film element 4Ec has a characteristic of allowing only the transmission of the TM polarized light and a beam reduction function, similarly to the thin film lens 4ca.

In the optical waveguide element 10E, since the optical filter unit 4E is integrally formed of photonic crystal, the optical axes of the thin film lenses of the thin film elements 4Eb and 4Ec may be aligned more accurately. Accordingly, the excessive loss caused by the optical axis shift may be reduced.

Seventh Embodiment

Figure 6:
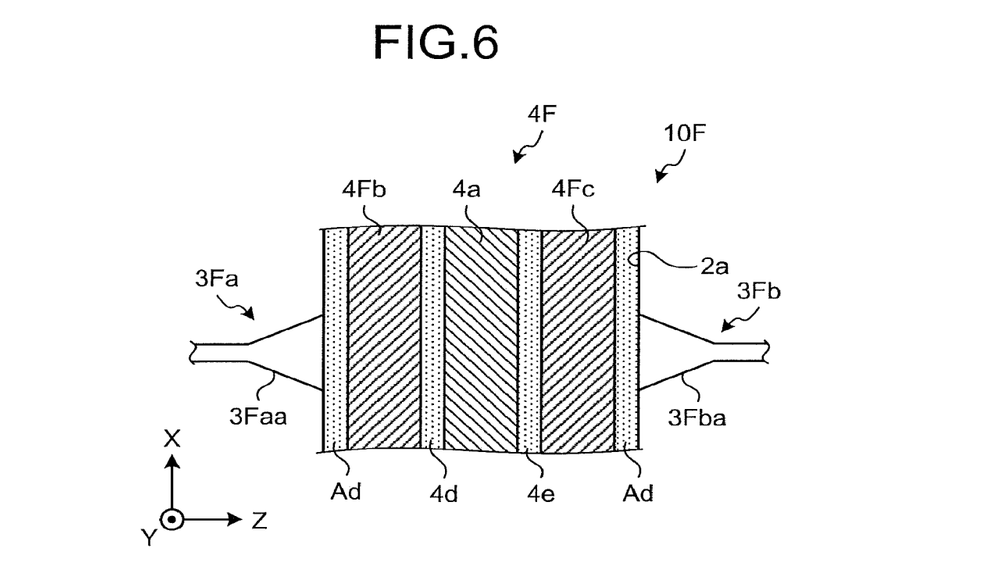
FIG. 6 is a schematic diagram illustrating an optical waveguide element according to a seventh embodiment.

Next, an optical waveguide element according to a seventh embodiment will be described. FIG. 6 is a schematic diagram illustrating the optical waveguide element according to the seventh embodiment.

As illustrated in FIG. 6, an optical waveguide element 10F according to the seventh embodiment has a configuration in which the optical filter unit 4 is replaced by an optical filter unit 4F and the first optical waveguide 3a and the second optical waveguide 3b are respectively replaced by a first optical waveguide 3Fa and a second optical waveguide 3Fb as compared with the optical waveguide element 10 according to the first embodiment. Further, the optical waveguide element 10F has a function of converting the input TE polarized light into the TM polarized light and outputting the TM polarized light, similarly to the optical waveguide element 10. Hereinafter, the first optical waveguide 3Fa, the second optical waveguide 3Fb, and the optical filter unit 4F will be described in detail.

The first optical waveguide 3Fa and the second optical waveguide 3Fb respectively include taper portions 3Faa and 3Fba formed such that the optical waveguide width increases toward the slit 2a in the X direction.

The optical filter unit 4F includes the optical filter 4a and thin film elements 4Fb and 4Fc. The optical filter 4a and two thin film elements 4Fb and 4Fc adhere to each other by translucent adhesives 4d and 4e to form the optical filter unit 4F.

The thin film elements 4Fb and 4Fc are formed of photonic crystal. Further, the thin film elements 4Fb and 4Fc are provided with the thin film lenses formed of photonic crystal. Here, the thin film lens provided in the thin film element 4Fb has a characteristic of allowing only the transmission of the TE polarized light, with respect to the light input from the first optical waveguide 3Fa, similarly to the thin film lens 4ba, but has a function of enlarging the beam diameter only in the Y direction differently from the thin film lens 4ba (FIG. 1C). Further, the thin film lens provided in the thin film element 4Fc has a characteristic of allowing only the transmission of the TM polarized light, with respect to the light input from the first optical waveguide 3Fa, similarly to the thin film lens 4ca, but has a function of reducing the beam diameter only in the Y direction differently from the thin film lens 4ca (FIG. 1C).

In the optical waveguide element 10F, the adjustment of the beam diameter of the light that propagates into the slit 2a is performed by the taper portions 3Faa and 3Fba in the X direction and is performed by the thin film lenses provided in the thin film elements 4Fb and 4Fc in the Y direction. In this way, the slit loss may be reduced by adjusting the beam diameter of the light that propagates into the slit 2a by the combination of the thin film lens and the taper portions of the waveguides.

Eighth Embodiment

Figure 7:
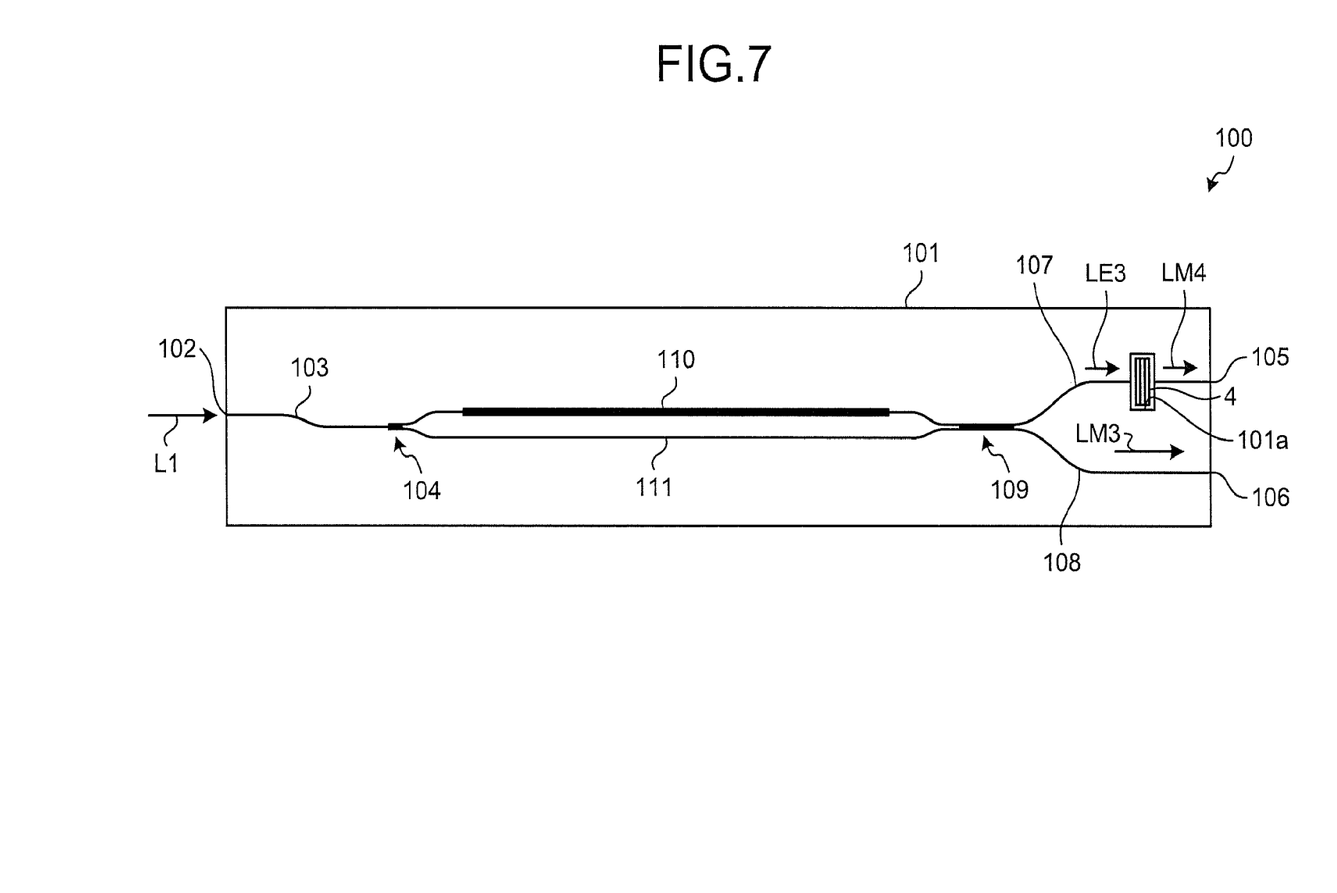
FIG. 7 is a schematic diagram illustrating an optical waveguide element according to an eighth embodiment.

Next, an optical waveguide element according to an eighth embodiment will be described. FIG. 7 is a schematic diagram illustrating the optical waveguide element according to the eighth embodiment. An optical waveguide element 100 includes a cladding portion 101 which is formed of quartz glass and a plurality of optical waveguides located inside the cladding portion 101. The plurality of optical waveguides include an input optical waveguide 103 of which one end portion becomes an input light port 102, a 1×2 MMI (Multi Mode Interference) optical coupler 104 in which the other end of the input optical waveguide 103 is connected to a one-port side of the optical coupler 104, output optical waveguides 107 and 108 of which one end portions respectively become output light ports 105 and 106, a 2×2 MMI optical coupler 109 in which the other end portions of the output optical waveguides 107 and 108 are connected to a one two-port side of the optical coupler 109, and arm waveguides 110 and 111 which are connected to a two-port side of the MMI optical coupler 104 at one ends and to the other two-port side of the MMI optical coupler 109. The plural optical waveguides are formed of quartz glass in which fine glass particles of $ZrO_2$ are dispersed. Further, the MMI optical couplers 104 and 109 and the arm waveguides 110 and 111 constitute a Mach-Zehnder interferometer (MZI).

Further, the cladding portion 101 is provided with a slit 101a formed to divide the output optical waveguide 107 into two parts. The optical waveguide element 100 further includes the optical filter unit 4 inserted into the slit 101a.

In the optical waveguide element 100, the waveguide width of the arm waveguide 110 is wider than the waveguide width of the arm waveguide 111 and the cross-section is rectangular. Accordingly, the birefringences of the arm waveguides 110 and 111 are respectively set to have an interference characteristic so as to allow the TM polarized light included in the arbitrary polarized wave light L1 input from the input light port 102 at a predetermined wavelength (for example, 1.55 μm) to output as light LM3 by about 100% from the MMI optical coupler 109 to the output optical waveguide 108, and the TE polarized light to output as light LE3 by about 100% from the MMI optical coupler 109 to the output optical waveguide 107. Further, the optical filter unit 4 converts the light LE3 into TM polarized wave light LM4 and outputs the TM polarized wave light. Accordingly, the optical waveguide element 100 has a function of a polarization beam splitter of polarizing and dividing the light L1 input from the input light port 102 into the TE polarized light and the TM polarized light, converting the TE polarized light into the TM polarized light, and outputting the light from the output light ports 105 and 106.

Since the optical waveguide element 100 uses the principle of reciprocity of the optical circuit, the optical waveguide element also has a function of a polarization beam combiner as well as a polarization beam split function. Thus, the optical waveguide element 100 serves as a polarization beam splitter/combiner.

In all of the optical waveguides, the relative refractive index difference Δ is 5.5% at the wavelength of 1.55 μm, but similarly to the optical waveguide element 10, the slit loss of the slit 101a is reduced by the optical filter unit 4 so that, for example, the slit loss becomes 0.5 dB.

Incidentally, there is a case in which the optical waveguide element 100 is optically connected to an optical communication standard single mode optical fiber (hereinafter, referred to as standard SMF) having a zero dispersion wavelength at the wavelength of about 1.3 μm based on ITU-T G.652 in the input light port 102 and the output light ports 105 and 106. In this case, when the thin film lens having a beam reduction function is provided to the input light port 102 and the thin film lens having a beam enlargement function is provided to the output light ports 105 and 106, the connection loss between the optical waveguide element 100 and the standard SMF may be reduced. Additionally, waveguides formed of different materials such as an optical waveguide formed of an InP-based semiconductor material or a silicon thin wire optical waveguide or a quartz-based PLC having a relative refractive index difference Δ different from that of the optical waveguide element 100 may be connected to the output light ports 105 and 106 as well as the standard SMF.

Ninth Embodiment

Figure 8:
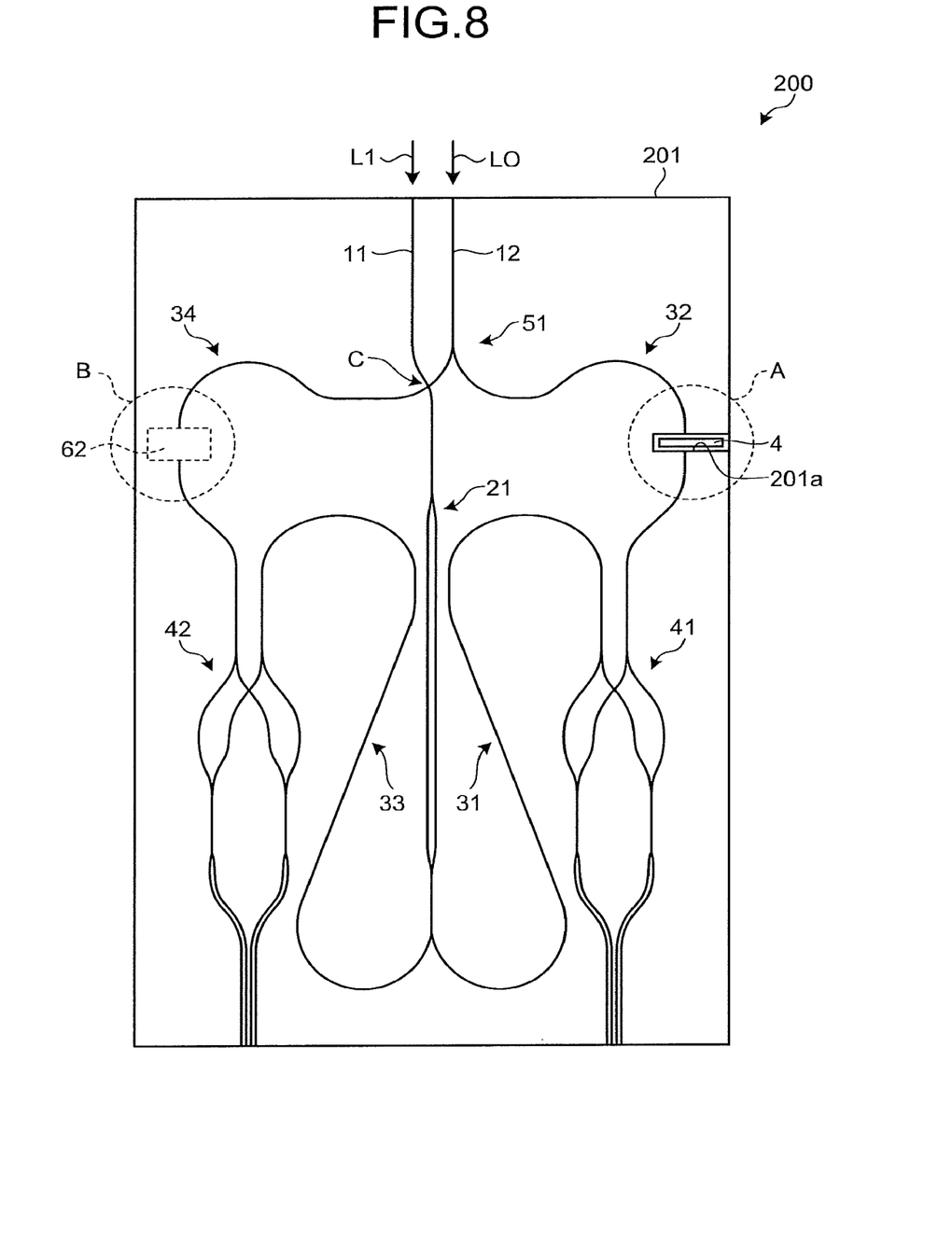
FIG. 8 is a schematic diagram illustrating an optical waveguide element according to a ninth embodiment.

FIG. 8 is a schematic diagram illustrating an optical waveguide element according to a ninth embodiment. An optical waveguide element 200 serves as a polarization beam splitter (PBS) integrated type coherent mixer. The optical waveguide element 200 is a configuration example used as a coherent mixer used in a DP-QPSK modulation type demodulator.

The optical waveguide element 200 includes a cladding portion 201 which is formed of quartz glass and a plurality of optical waveguides which are located inside the cladding portion 201. The plurality of optical waveguides include input optical waveguides 11 and 12, an optical waveguide constituting a polarization demultiplexer 21, connection optical waveguides 31, 32, 33, and 34, an optical waveguide constituting 90-degree hybrid elements 41 and 42, and a Y-branch optical waveguide 51. These optical waveguides are formed of quartz glass obtained by dispersing fine glass particles of $ZrO_2$.

Further, in a region A, the cladding portion 201 is provided with a slit 201a which divides the connection optical waveguide 32 into two parts. The optical waveguide element 200 further includes the optical filter unit 4 inserted into the slit 201a. Further, in a region B, the connection optical waveguide 34 is provided with a loss compensation unit 62.

The input optical waveguide 11 that is to input light L1 corresponding to a signal light is connected to the polarization demultiplexer 21 through an S-shaped bent portion obtained by the combination of bent portions in which the curvature radius is the same at the positive and negative curvature portions and the angle of the arc is the same. On the other hand, the input optical waveguide 12 that is to input local oscillation light LO is connected to the Y-branch optical waveguide 51 in a substantially linear shape.

More specifically, the polarization demultiplexer 21 includes a Y-branch optical waveguide, a directional coupler, and two arm optical waveguides connecting the Y-branch optical waveguide and the directional coupler and constitutes the MZI-type interferometer. The connection optical waveguides 31 and 33 are optical paths connecting the optical paths of the light beams demultiplexed by the polarization demultiplexer 21 to the 90-degree hybrid elements 41 and 42.

The Y-branch optical waveguide 51 divides the local oscillation light LO input to the input optical waveguide 12 to the connection optical waveguides 32 and 34 at the division ratio of 1:1. The connection optical waveguides 32 and 34 are optical paths respectively connecting the optical paths of the light beams divided by the Y-branch optical waveguide 51 to the 90-degree hybrid elements 41 and 42.

The 90-degree hybrid elements 41 and 42 are a type of interference circuit and are circuits which divide the input light L1 and the local oscillation light LO into two parts, gives a phase difference of 90° as a relative phase difference of the optical wave to the local oscillation light LO divided into two parts, and then mixes one of the two divided lights L1 with the local oscillation light LO and the other of the two divided lights L1 and the local oscillation light LO.

As described above, the slit 201a is provided in the region A of the connection optical waveguide 32 from the Y-branch optical waveguide 51 to the 90-degree hybrid element 41 and the optical filter unit 4 is inserted into the slit 201a. The local oscillation light LO passing through the optical filter unit 4 is input to the 90-degree hybrid element 41 after the polarized wave rotates by 90°.

On the other hand, the loss compensation unit 62 is provided in the region B of the connection optical waveguide 34 from the Y-branch optical waveguide 51 to the 90-degree hybrid element 42. The loss compensation unit 62 does not have a function of rotating the polarized wave. Thus, the local oscillation light LO with the currently polarized wave is input to the 90-degree hybrid element 42.

The loss compensation unit 62 is formed as, for example, a slit which is provided to divide the connection optical waveguide 34 and into which the half wavelength plate is not inserted. The function of the loss compensation unit 62 will be described below.

In the above-described optical waveguides, the relative refractive index difference Δ is 5.5% at the wavelength of 1.55 μm, but in the connection optical waveguide 32, the slit loss of the slit 201a is reduced to, for example, 0.5 dB by the optical filter unit 4. Here, loss due to the presence of the slit 201a and the optical filter unit 4 is generated. Thus, the local oscillation light input to the 90-degree hybrid element 41 in the current state undergoes more excessive loss as compared with the local oscillation light input to the 90-degree hybrid element 42. Here, in the optical waveguide element 200, the loss compensation unit 62 is provided in the connection optical waveguide 34 in order to compensate for the loss.

For the above-described purpose, the slit width of the loss compensation unit 62, when the loss compensation unit 62 is formed of a slit, is preferably designed so as to allow an amount of loss corresponding to the loss generated by the optical filter unit 4 and the slit 201a of the connection optical waveguide 32 to be generated. Additionally, since an intersection point C formed as a cross waveguide structure exists in the connection optical waveguide 34, it is more desirable to design the slit width of the loss compensation unit 62 in consideration of the intersection loss at the intersection point C. Additionally, the loss compensation unit 62 is not limited to the slit, but may be formed as one or a plurality of cross waveguide structures provided in series or one or a plurality of tapered waveguide structures provided in series.

Tenth Embodiment

Figure 9:
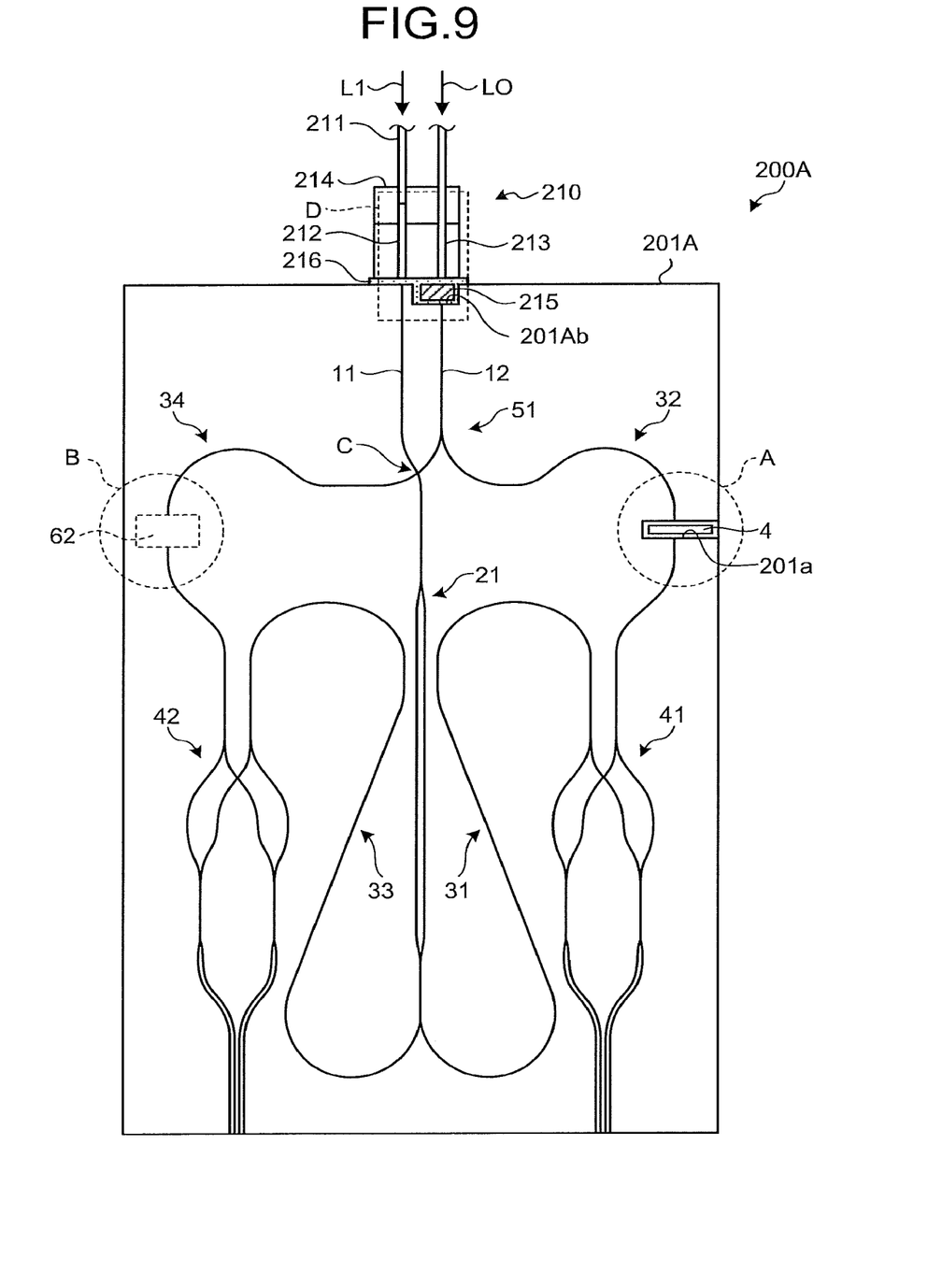
FIG. 9 is a schematic diagram illustrating an optical waveguide element according to a tenth embodiment.

FIG. 9 is a schematic diagram illustrating an optical waveguide element according to a tenth embodiment. An optical waveguide element 200A has a configuration in which the cladding portion 201 of the optical waveguide element 200 is replaced by a cladding portion 201A including a notch portion 201Ab and a connection portion 210 for inputting the light L1 and the local oscillation light LO as signal light is added. Hereinafter, the notch portion 201Ab and the connection portion 210 will be described.

Figure 10:
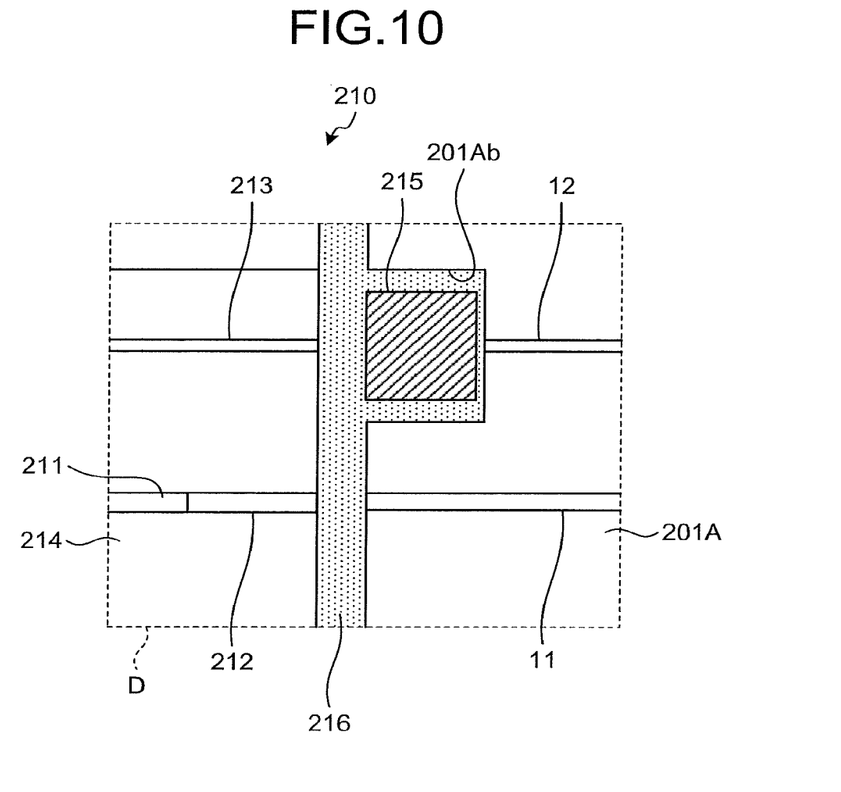
FIG. 10 is a schematic diagram illustrating a part of FIG. 9 in an enlarged state.

FIG. 10 is a schematic diagram illustrating a region D including the connection portion 210 and the notch portion 201Ab of FIG. 9 in an enlarged state. The connection portion 210 includes a single mode optical fiber 211, a high relative refractive index difference optical fiber 212, a polarized wave holding optical fiber 213, a holding member 214, a lens 215, and an adhesive 216.

The single mode optical fiber 211 is, for example, a standard SMF based on ITU-T G.652. In the single mode optical fiber 211, the relative refractive index difference of the core to the clad is about 0.3% and the MFD at the wavelength of 1.55 µm is 10 to 11 µm.

The high relative refractive index difference optical fiber 212 is fusion-connected to the single mode optical fiber 211. A relative refractive index difference of the core to the clad in the high relative refractive index difference optical fiber 212 is larger than that in the single mode optical fiber 211. Specifically, the high relative refractive index difference optical fiber 212 is, for example, a quartz glass-based optical fiber of which the relative refractive index difference of the core to the clad is 2.0% to 3.0% and the MFD at the wavelength of 1.55 µm is, for example, 3.0 µm to 5.0 µm. Further, in the high relative refractive index difference optical fiber 212, for example, the core diameter is 3 µm to 4 µm and the cutoff wavelength λc is 1530 nm or less.

The high relative refractive index difference optical fiber 212 has a function of reducing the MFD of the light L1 that propagates through the single mode optical fiber 211 and enabling the connection to the input optical waveguide 11 with low-connection loss.

The polarized wave holding optical fiber 213 allows the local oscillation light LO to propagate therethrough, while keeping a linear polarized wave state, and outputs the light as the TE polarized light to the input optical waveguide 12. Similarly to the single mode optical fiber 211, in the polarized wave holding optical fiber 213, the relative refractive index difference of the core to the clad is about 0.3% and the MFD at the wavelength of 1.55 µm is 10 to 11 µm.

The holding member 214 holds the single mode optical fiber 211, the high relative refractive index difference optical fiber 212, and the polarized wave holding optical fiber 213. The holding member 214 is formed of, for example, quartz-based glass. The holding member 214 includes, for example, a substrate provided with a V-groove accommodating a connector for the single mode optical fiber 211 and the high relative refractive index difference optical fiber 212, and the polarized wave holding optical fiber 213, and a lid pressing the accommodated optical fibers. Each optical fiber is fixed to the V-groove by an adhesive.

The lens 215 is accommodated in the notch portion 201Ab formed in the cladding portion 201A. The lens 215 is, for example, a thin film lens such as a photonic crystal lens and is used to condense the local oscillation light LO output from the polarized wave holding optical fiber 213 and enabling the optical connection to the input optical waveguide 12 with low-connection loss. Due to the existence of the lens 215, a low connection loss between the polarized wave holding optical fiber 213 and the input optical waveguide 12 may be realized even when the high relative refractive index difference optical fiber for keeping the polarized wave is not used.

The adhesive 216 is used to fix the holding member 214 and the lens 215 to the cladding portion 201A by adhering. Here, since the adhesive 216 has a predetermined thickness between the holding member 214 and the cladding portion 201A, the holding member 214 may be prevented from contacting the lens 215 by the adhesive 216 even when the lens 215 has a thickness in which the lens protrudes from the notch portion 201Ab.

Additionally, in the optical waveguide element 200, the single mode optical fiber 211 and the input optical waveguide 11 may be connected to each other with low connection loss by the thin film lens without using the high relative refractive index difference optical fiber 212.

Additionally, in the above-described embodiment, according to an accurate examination of the inventors, in the optical waveguide element having the same waveguide structure, the same slit width, and the same taper portion, the slit loss is about 0.5 dB when the relative refractive index difference $\Delta$ is 1.5%, the slit loss is about 1 dB when the relative refractive index difference $\Delta$ is 2.5%, and the slit loss is about 3 dB when the relative refractive index difference $\Delta$ is 5.5%. In this way, since the slit loss is remarkably large in practical use when the relative refractive index difference $\Delta$ is 2.5% or more, the configuration of the embodiment of this disclosure is particularly preferable for the optical waveguide element of which the relative refractive index difference $\Delta$ is 2.5% or more. Here, the disclosure can be also applied to the optical waveguide element of which the relative refractive index difference $\Delta$ is smaller than 2.5%.

Further, the optical waveguide element of the above-described embodiment is formed of quartz-based glass, but this disclosure can be also applied to an optical waveguide element of a high relative refractive index difference including a silicon thin wire optical waveguide or an optical waveguide formed of an InP-based semiconductor material.

Further, the thin film lens of the above-described embodiment is the photonic crystal lens, but the type of the thin film lens according to this disclosure is not limited as long as the lens has a thickness (for example, 5 to 100 µm and desirably 20 µm or less) in which the lens can be inserted into the slit provided to divide the optical waveguide of the optical waveguide element. Further, in the above-described embodiments, one or two thin film elements provided with the thin film lens are provided, but more thin film elements may be provided.

According to the disclosure, there is an effect that the optical waveguide element with reduced slit loss can be realized.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical waveguide element comprising:
    a cladding portion formed on a substrate;
    an optical waveguide which is formed inside the cladding portion and has a refractive index higher than that of the cladding portion;
    an optical filter which is inserted into a slit formed in the cladding portion to divide the optical waveguide into a first optical waveguide and a second optical waveguide;
    a first thin film element which is inserted into the slit along with the optical filter and is provided with a first thin film lens; and
    a second thin film element which is inserted into the slit along with the optical filter and the first thin film element, and is provided with a second thin film lens that spreads the light that has propagated through the first optical waveguide and outputs into the slit toward the optical filter, wherein
    the first thin film lens provided in the first thin film element converges light that has propagated through the first optical waveguide and outputs into the slit into the second optical waveguide,
    the first and second thin film lenses that are provided in the first and second thin film elements, respectively, allow only a linear polarized wave to transmit therethrough, and are disposed so that polarization directions of transmitted linear polarized waves of the first and second thin film elements are orthogonal to each other, and
    an optical axis of the optical filter is disposed to form an angle of 45° with respect to the polarization directions of the transmitted linear polarized wave of the first and second thin film elements.

2. The optical waveguide element according to claim 1, wherein the optical filter is a half wavelength plate.

3. The optical waveguide element according to claim 1, wherein the first thin film lens provided in the first thin film element is formed of photonic crystal.

4. The optical waveguide element according to claim 3, wherein the first thin film element and the optical filter are integrally formed of photonic crystal.

5. The optical waveguide element according to claim 1, wherein a relative refractive index difference of the optical waveguide to the cladding portion is 2.5% or more.

6. The optical waveguide element according to claim 1, wherein the cladding portion and the optical waveguide are formed of quartz-based glass, and the optical waveguide contains zirconia ($ZrO_2$).

7. The optical waveguide element according to claim 1, further comprising a plurality of the optical waveguides, wherein the plurality of the optical waveguides constitute a coherent mixer.

8. The optical waveguide element according to claim 1, further comprising a plurality of the optical waveguides, wherein the plurality of the optical waveguides constitute a polarization beam splitter/combiner.

* * * * *